(12) United States Patent
Wachs et al.

(10) Patent No.: US 11,811,908 B2
(45) Date of Patent: *Nov. 7, 2023

(54) OUTPUTTING A KEY BASED ON AN AUTHORIZED SEQUENCE OF OPERATIONS

(71) Applicant: Cryptography Research, Inc., Sunnyvale, CA (US)

(72) Inventors: Megan Anneke Wachs, San Francisco, CA (US); Ambuj Kumar, Sunnyvale, CA (US); Benjamin Che-Ming Jun, Burlingame, CA (US)

(73) Assignee: Cryptography Research, Inc., San Jose, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 16/786,796

(22) Filed: Feb. 10, 2020

(65) Prior Publication Data

US 2020/0304287 A1 Sep. 24, 2020

Related U.S. Application Data

(63) Continuation of application No. 16/283,574, filed on Feb. 22, 2019, now Pat. No. 10,560,260, which is a continuation of application No. 14/808,691, filed on Jul. 24, 2015, now Pat. No. 10,218,496.

(60) Provisional application No. 62/093,231, filed on Dec. 17, 2014, provisional application No. 62/033,061, filed on Aug. 4, 2014.

(51) Int. Cl.
| | |
|---|---|
| *H04L 9/06* | (2006.01) |
| *H04L 9/08* | (2006.01) |
| *H04L 9/40* | (2022.01) |
| *H04L 9/32* | (2006.01) |

(52) U.S. Cl.
CPC .......... *H04L 9/0631* (2013.01); *H04L 9/0643* (2013.01); *H04L 9/0861* (2013.01); *H04L 9/3236* (2013.01); *H04L 63/06* (2013.01)

(58) Field of Classification Search
CPC ... H04L 9/3236; H04L 9/0643; H04L 9/0861; H04L 9/0631; H04L 63/06
USPC .......................................................... 713/171
See application file for complete search history.

(56) References Cited

U.S. PATENT DOCUMENTS

| | | |
|---|---|---|
| 7,212,634 B2 | 5/2007 | Briscoe |
| 7,549,058 B1 | 6/2009 | Wang et al. |
| 7,551,056 B2 | 6/2009 | Scholze |
| 7,757,087 B2 * | 7/2010 | Isozaki ................. H04L 9/0844 713/171 |

(Continued)

OTHER PUBLICATIONS

Chinese Office Action dated Oct. 14, 2015 for CN Application No. 201520593919.6. 4 Pages. (With Translation).

(Continued)

*Primary Examiner* — Amare F Tabor
(74) *Attorney, Agent, or Firm* — Lowenstein Sandler LLP

(57) ABSTRACT

Values and a sequence of operations associated with generating a key may be received. A determination may be made as to whether the sequence of operations associated with the key matches an authorized sequence of operations. The key may be outputted when the received sequence of operations matches the authorized sequence of operations and the key may not be outputted when the received sequence of operations does not match the authorized sequence of operations.

20 Claims, 10 Drawing Sheets

(56) References Cited

U.S. PATENT DOCUMENTS

| | | | |
|---|---|---|---|
| 7,853,783 B2 | 12/2010 | Bin et al. | |
| 7,903,820 B2 | 3/2011 | Waisbard | |
| 7,904,717 B2 | 3/2011 | Pilant et al. | |
| 7,925,891 B2 * | 4/2011 | Crispin | H04L 9/0637 713/190 |
| 7,992,193 B2 | 8/2011 | Maino et al. | |
| 8,024,583 B2 | 9/2011 | Shimizu et al. | |
| 8,050,405 B2 | 11/2011 | Camp, Jr. et al. | |
| 8,086,864 B2 | 12/2011 | Kim et al. | |
| 8,204,220 B2 | 6/2012 | Candelore | |
| 8,335,317 B2 * | 12/2012 | Vanstone | H04L 9/0841 380/282 |
| 8,897,442 B2 | 11/2014 | Fujisaki | |
| 9,230,455 B2 | 1/2016 | Probert | |
| 2006/0262933 A1 | 11/2006 | Furukawa | |
| 2007/0192631 A1 | 8/2007 | Anderson | |
| 2008/0034197 A1 | 2/2008 | Engel et al. | |
| 2008/0052533 A1 | 2/2008 | Iida et al. | |
| 2011/0093484 A1 | 4/2011 | Bando et al. | |
| 2012/0011566 A1 | 1/2012 | Youm et al. | |
| 2013/0239214 A1 | 9/2013 | Klein et al. | |
| 2014/0006786 A1 | 1/2014 | Campagna et al. | |
| 2014/0098953 A1 | 4/2014 | Dellow | |
| 2015/0006894 A1 | 1/2015 | Bandyopadhyay et al. | |
| 2015/0363334 A1 | 12/2015 | Mundra et al. | |

OTHER PUBLICATIONS

Schaumont et al., "A Video Interface with End-point Security," Technical Report, ECE Department, Virginia Tech., Jan. 2008. 6 pages.

* cited by examiner

OUTPUTTING A KEY BASED ON AN AUTHORIZED SEQUENCE OF OPERATIONS

RELATED APPLICATIONS

This application is a continuation of U.S. patent application Ser. No. 16/283,574, filed on Feb. 22, 2019, which is a continuation of U.S. patent application Ser. No. 14/808,691, filed on Jul. 24, 2015, now U.S. Pat. No. 10,218,496, which claims the benefit under 35 U.S.C. § 119(e) of U.S. Provisional Application 62/033,061 filed on Aug. 4, 2014 and U.S. Provisional Application 62/093,231 filed on Dec. 17, 2014, which are hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
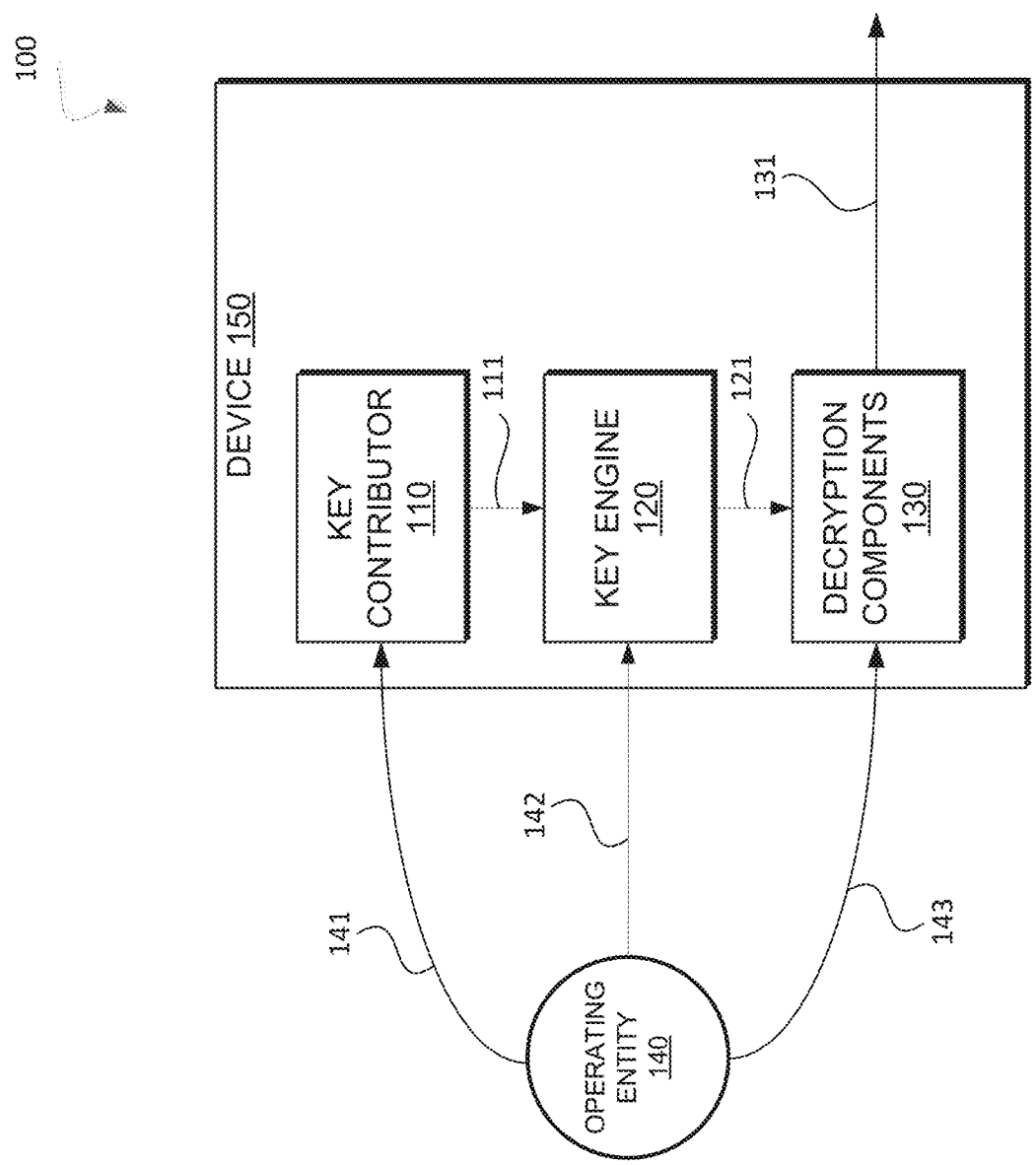
FIG. 1 illustrates an environment associated with the outputting of a key based on an authorized sequence of operations in accordance with some embodiments.

Aspects of the present disclosure are directed to outputting a key based on an authorized sequence of operations. An integrated circuit may include a key engine component that generates a key based on received input values and a sequence of operations that are to be performed with the input values. For example, the key engine component may receive a value from a key contributor component (e.g., a component that generates an input value for the key engine component) of the integrated circuit and additional values from an operating entity (e.g., software) using the integrated circuit. The operating entity may further provide the sequence of operations to be performed by the key engine component to generate the key. In response to the received values and the sequence of operations, the key engine component may generate and output the key which may subsequently be used to encrypt or decrypt data. As an example, the operating entity may be a content provider that transmits encrypted video data to a decryption component of the integrated circuit and provides values and the sequence of commands for the key engine component to generate and transmit a key to the decryption component for decrypting the encrypted video data.

As previously described, the key engine component may receive a sequence of operations from an operating entity that are used to generate the key. If the operating entity is an unauthorized entity (e.g., an entity that does not know the key that will be generated by the key engine component), then the unauthorized entity may be able to derive the key by retrieving an output of a portion of the sequence of operations. For example, the key may be intended to be generated based on an authorized sequence of operations that includes a first, second, and third operation. The first operation may be performed, then the second operation may be performed based on an output of the first operation, and the third operation may subsequently be performed based on an output of the second operation. The output of the third operation may then be output or provided as the generated key. However, the unauthorized entity may provide a sequence of operations that includes the first and second operations but does not include the third operation. Instead, the sequence of operations provided by the unauthorized entity may direct the key engine to perform the first operation, then perform the second operation, and output or provide the output of the second operation. For example, the output of the second operation may be a portion of the generated key or a value that is used to generate the key. If the unauthorized entity retrieves the portion of the generated key or the value that is used to generate the key, then unauthorized entity may be able to derive the key from the retrieved portion or value. As such, the key that is used to decrypt encrypted data may be retrieved by an unauthorized entity resulting in the unsecured transmission of the encrypted data.

The key engine component may be implemented to output, transmit, or provide the key after an authorized sequence of operations has been performed. For example, the authorized sequence of operations may specify a number of operations, types of operations, sources of input data for the operations, destination for outputs of the operations, and the order of the operations that are to be performed by the key engine component when generating a key. The key engine component may then output or provide the generated key based on the authorized sequence of operations. For example, if the sequence of operations received from the operating entity matches the authorized sequence of operations, then the generated key may be outputted or provided by the key engine component. However, if the received sequence of operations does not match the authorized sequence of operations, then no value (e.g., a key, partial key, or a value used to generate the key) may be outputted or provided by the engine component.

Furthermore, the key engine component may output or provide a key based on a received hash value and a status of a key contributor component of the integrated circuit. The key contributor component may provide a value (e.g., a hardware value) that is used to generate the key. The key engine component may receive the hash value for a first request to generate a key. If the received hash value matches a hash value calculated by the key engine component for the generated key, then the key may be output or provided by the key engine component to a decryption component. For a subsequent second request to generate another key, the key engine component may generate and output the key if the sequence of operations and the status of the key contributor component between the first request to generate the key and the second request to generate the key have not changed. However, if the sequence of operations or the status of the key contributor component has changed from the first request to the second request, then the key engine component may request the hash value from the operating entity and the key may be provided or output if the received hash value matches the hash value calculated by the key engine component. As such, the key engine component may only require a hash value to be received from the operating entity when either the sequence of operations changes or when the status of the key contribution component has changed in relation to the prior key that was generated.

As described above, the key engine component may be used to output or provide a value (e.g., a key) when certain conditions are satisfied. For example, the key engine component may output a value when a received sequence of operations matches an authorized sequence of operations. Furthermore, the key engine component may output a value when a hash value received from an operating entity matches a hash value that the key engine component calculates for the generated key. The outputting or providing of a value based on the above described conditions may ensure that values that correspond to a portion of the key or a value that is used to generate the key is not outputted or provided by the key engine component. Thus, an unauthorized entity may not be able to retrieve the partial key or value used to generate the key and subsequently attempt to derive the key. Aspects of the present disclosure address the above and other deficiencies.

FIG. 1 illustrates an example environment 100 associated with the outputting of a key based on an authorized sequence of operations. In general, the environment 100 may include a device or integrated circuit 150 that receives a sequence of commands and values from an operating entity 140 to generate and output or provide a key 131.

As shown in FIG. 1, the integrated circuit 150 may include a key contributor component 110, a key engine component 120, and decryption components 130. In some embodiments, the key contributor component 110, key engine component 120, and the decryption components 130 may each be included on the same integrated circuit 150. The integrated circuit 150 may be included in a device (e.g., a set top box, television, etc.) that receives information from the operating entity 140 (e.g., a software application). The operating entity 140 may provide to the key contributor component 110 data 141 that includes an operator key contribution input value and an operator status. The operator key contribution input value may be referred to as an operator control word contribution (CWC). The operator status may specify configuration information for the key contributor component 110. Furthermore, the key contributor component 110 may provide a key contribution value 111 (also referred to as a CWC) to the key engine component 120 based on the operator status and the operator key contribution input value received from the operating entity 140. For example, the key contribution value 111 may be based on hardware of the key contribution component 110.

The key engine component 120 may receive the key contribution value 111 from the key contributor 110 and may further receive data 142 from the operating entity 140. The data 142 may include input values (e.g., software values) and a sequence of operations from the operating entity 140. Furthermore, the key engine component 120 may also receive, from the operating entity 140, a hash value corresponding to a key that will be generated by the key engine component 120. The key engine component 120 may perform the sequence of operations based on the received input values from the operating entity 140 and the key contribution value 111 from the key contributor component 110. Furthermore, the key engine component 120 may output, transmit, or provide the key 121 if the sequence of operations matches an authorized sequence of operations. Further details with regard to when the key 121 may be outputted, provided, or transmitted to the decryption component 130 are described in conjunction with FIGS. 2-5.

The decryption components 130 may receive the key 121 from the key engine component 120 and encrypted data 143 from the operating entity 140. Furthermore, the decryption components 130 may decrypt the encrypted data 143 with the key 121 to transmit the decrypted data 131.

Figure 2:
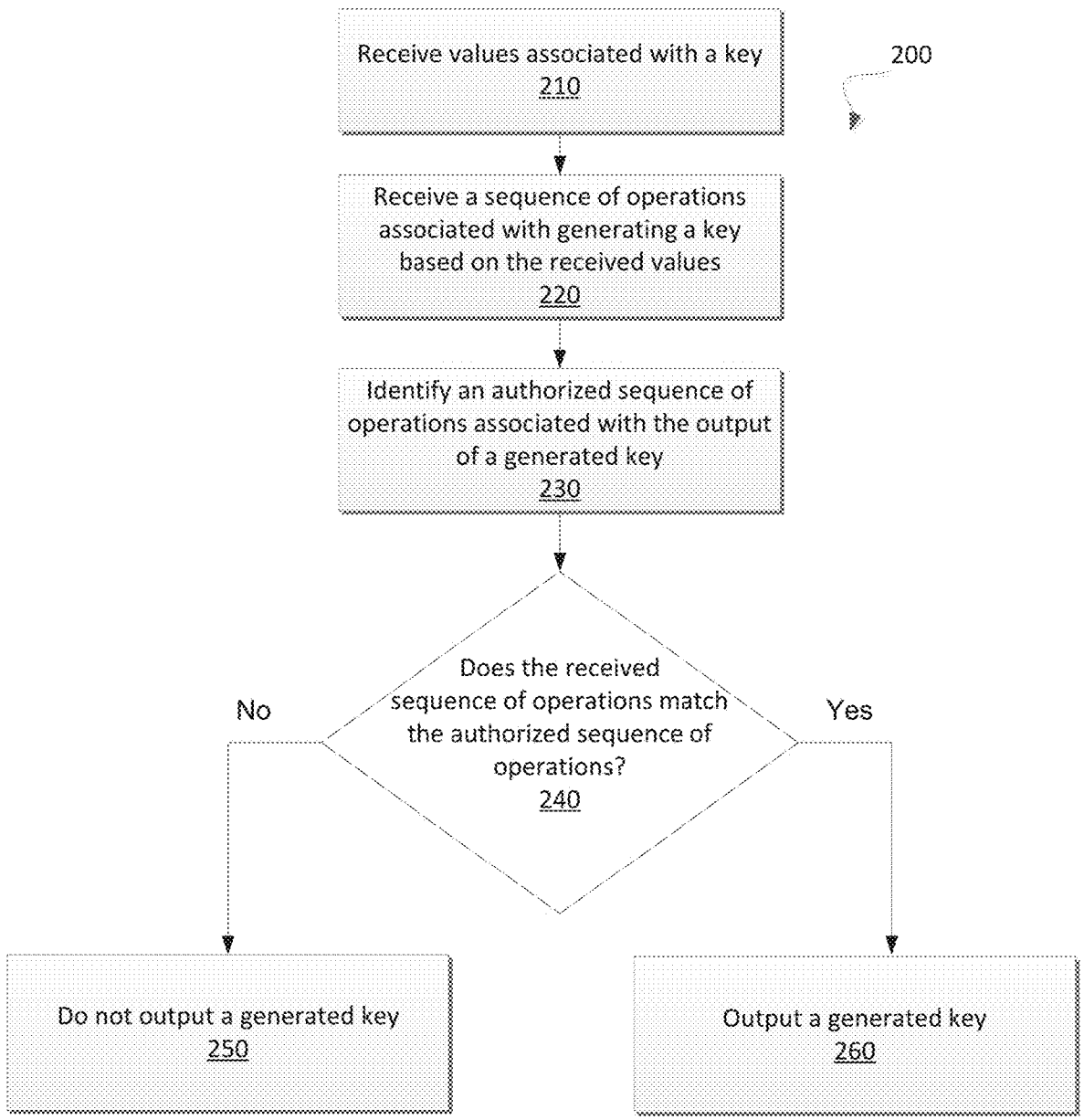
FIG. 2 is a flow diagram of an example method to output a generated key based on an authorized sequence of operations in accordance with some embodiments of the present disclosure.

FIG. 2 is a flow diagram of an example method 200 to output a generated key based on an authorized sequence of operations. In general, the method 200 may be performed by processing logic that may comprise hardware (e.g., processing device, circuitry, dedicated logic, programmable logic, microcode, hardware of a device, etc.), software (e.g., instructions run or executed on a processing device), or a combination thereof. The key engine component 120 of FIG. 1 may perform the method 200.

As shown in FIG. 2, the method 200 may begin with the processing logic receiving values associated with a key (block 210). For example, a hardware based value (e.g., a CWC from the key contributor component 110) and multiple software based values (e.g., input values from the operating entity 140) may be received. The hardware based values and the software based values may be used to generate the key. The values associated with the key may be key split values or other such input data that is used to generate a key. The processing logic may further receive a sequence of operations associated with generating a key based on the received values (block 220). The sequence of operations may specify a plurality of types of cryptographic operations, sources of inputs for the cryptographic operations, destinations for outputs of the cryptographic operations, and an order for performing the cryptographic operations. Further details with regard to sequences of operations are disclosed with reference to FIGS. 3A-3D. The processing logic may identify an authorized sequence of operations associated with the output of a generated key (block 230). The authorized sequence of operations may specify particular cryptographic operations, sources of inputs for the cryptographic operations, destinations of outputs for the cryptographic operations, and the order for the cryptographic operations to be performed. Subsequently, the processing logic may determine if the received sequence of operations matches the authorized sequence of operations (block 240). If the received sequence of operations does not match the authorized sequence of operations, then a generated key may not be outputted, provided, or transmitted (block 250). For example, the key engine component may not output or provide a value (e.g., a key, portion of the key, or a value used to generate the key) to the decryption components of an integrated circuit that includes the key engine component. However, if the received sequence of operations does match the authorized sequence of operations, then the generated key may be outputted, provided, or transmitted (block 260). For example, a key may be generated based on the received sequence of operations with the received hardware based and software based values. The key may then be outputted, provided, or transmitted to the decryption components for decrypting encrypted data.

As such, the key engine component may provide or output a value when a received sequence of commands matches an authorized sequence of commands. However, the key engine component may not provide or output the value when the received sequence of commands does not match the authorized sequence of commands.

Figure 3A:
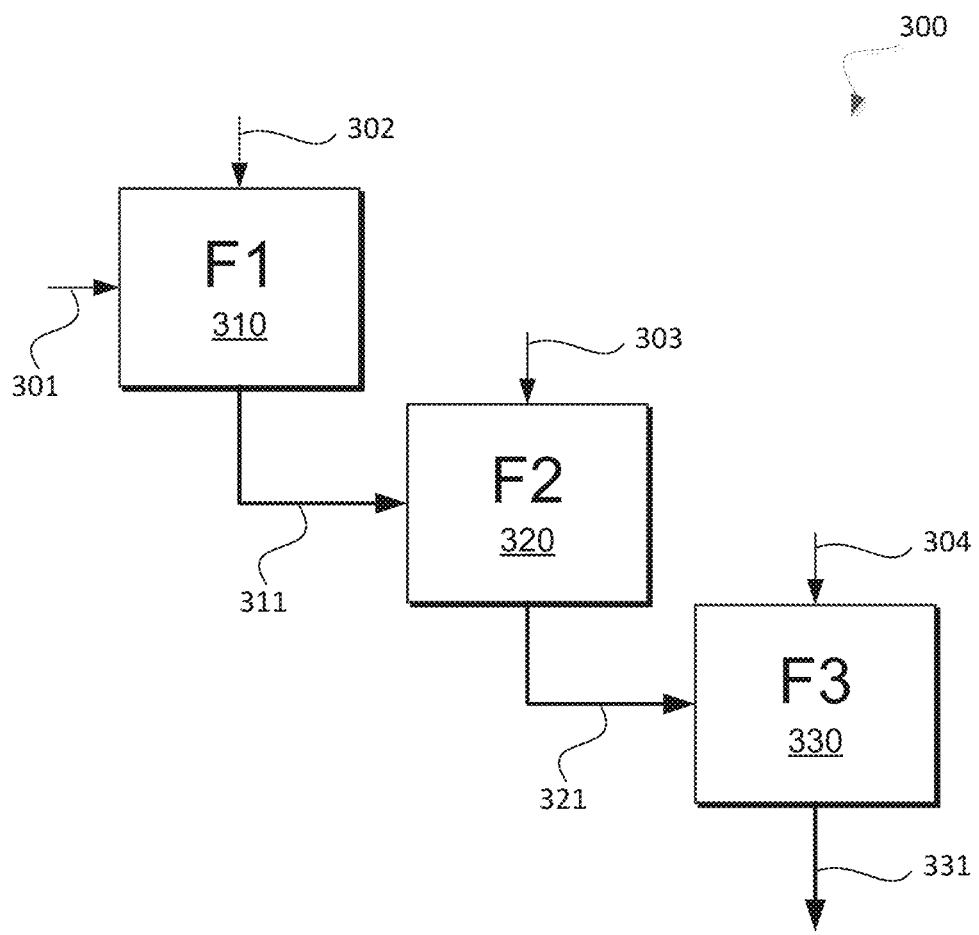
FIG. 3A is a block diagram of an example authorized sequence of operations to generate a key in accordance with some embodiments.

FIG. 3A is a block diagram of an example authorized sequence of operations 300 to generate a key. In general, the authorized sequence of operations 300 may be stored in a memory of a key engine component (e.g., key engine component 120 of FIG. 1).

As shown in FIG. 3A, the authorized sequence of operations 300 may include multiple functions or operations. For example, the authorized sequence of operations 300 may include a first operation 310, a second operation 320, and a third operation 330. In some embodiments, each of the operations 310, 320, and 330 may correspond to a cryptographic function or operation. Examples of such cryptographic operations include, but are not limited to, exclusive-or (XOR) operations, Advanced Encryption Standard (AES) operations, European Telecommunications Standards Institute (ETSI) operations, etc. The operations 310, 320, and 330 may receive values and may perform an operation with two values to generate an output value. For example, the first operation 310 may perform an XOR operation based on a first software based value 302 (e.g., from an operating entity 140) and a first hardware based value 301 (e.g., from a key contributor component) and provide a first output value 311 to the second operation 320. Furthermore, the second operation 320 may receive a second software based value 303 and may perform an AES operation with the second software based value 303 and the first output value 311 from the first operation 310 to generate a second output value 321. Subsequently, the third operation 330 may perform another XOR operation based on a third software based value 304 and the second output value 321 to generate a third output value 331. In some embodiments, the third output value 331 may be the generated key. For example, the final output value from the final operation of the sequence of operations may correspond to the generated key.

Figure 3B:
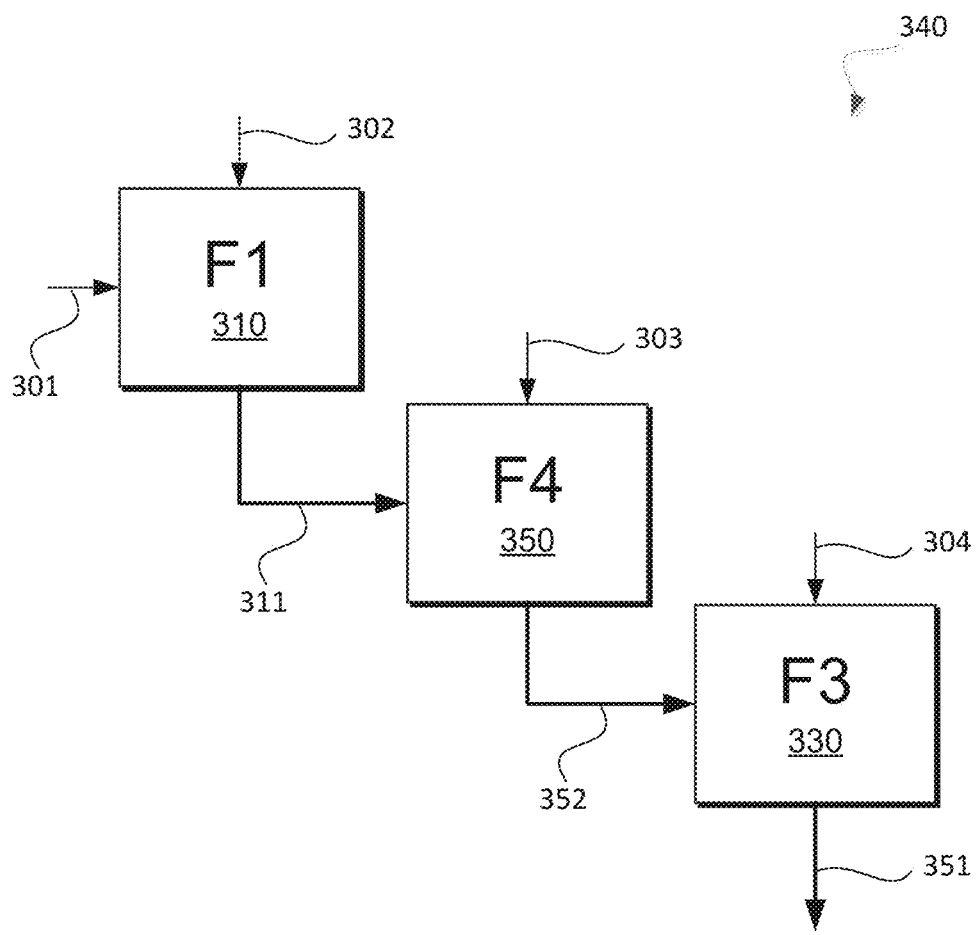
FIG. 3B is a block diagram of an example sequence of operations that does not match the authorized sequence of operations in accordance with some embodiments.

FIG. 3B is a block diagram of an example sequence of operations 340 that does not match the authorized sequence of operations 300. In general, the sequence of operations 340 may be received by a key engine component (e.g., key engine component 120 of FIG. 1) and compared with an authorized sequence of operations.

As shown in FIG. 3B, the sequence of operations 340 includes the first operation 310 and the third operation 330, but does not include the second operation 320. Instead, a fourth operation 350 has replaced the second operation 320. For example, a different cryptographic operation has replaced the second cryptographic operation used in the authorized sequence of operations and, as a result, the fourth operation 350 outputs a fourth output value 352 as opposed to the second output value of 321 and the third operation 330 may output another output value 351. As such, the sequence of operations 340 does not match the authorized sequence of operations 300 as at least one of the operations has changed (e.g., the second operation 320 corresponds to an AES operation and the fourth operation 350 corresponds to an XOR operation).

Figure 3C:
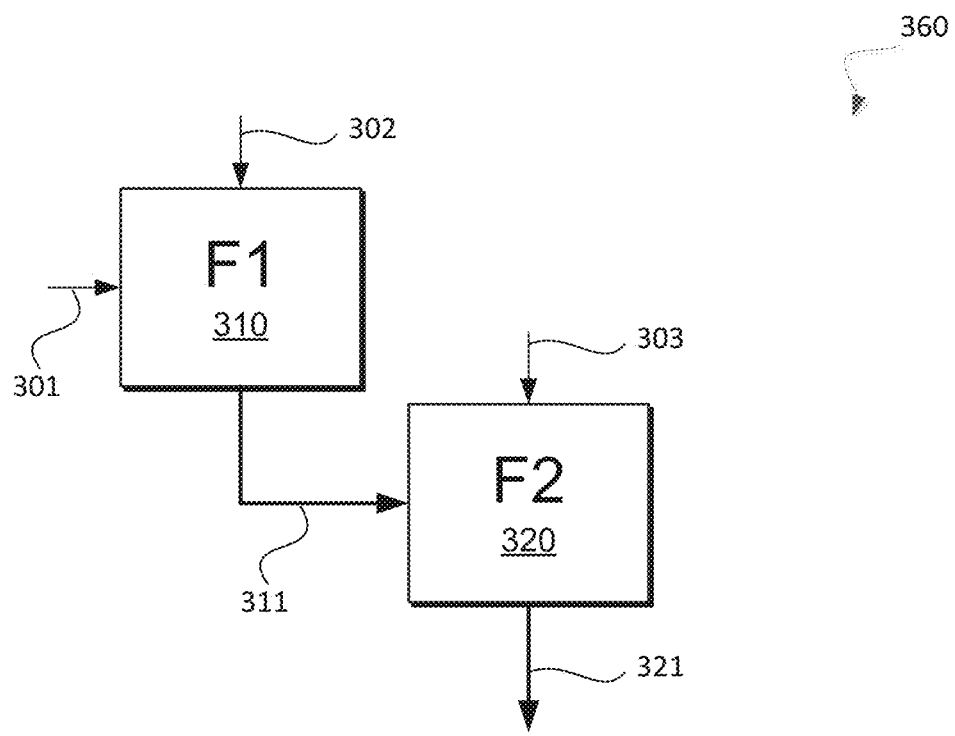
FIG. 3C is a block diagram of another example sequence of operations that does not match the authorized sequence of operations in accordance with some embodiments.

FIG. 3C is a block diagram of another example sequence of operations 360 that does not match the authorized sequence of operations 300. In general, the sequence of operations 360 may be received by a key engine component (e.g., the key engine component 120 of FIG. 1) and compared with an authorized sequence of operations.

As shown in FIG. 3C, the sequence of operations 360 includes a fewer number of operations than the authorized sequence of operations 300. For example, instead of including a first, second, and third operation, the sequence of operations 360 includes the first and second operations. As such, the sequence of operations 360 includes a command to provide or output the result of the second operation 321 (e.g., a value used in the generation of the key or a portion of the key). For example, the output destination of the second operation is not the third operation (e.g., the output of the second operation is not an input of the third operation as in the authorized sequence of operations). Since the sequence of operations 360 includes fewer operations and a different output destination for the second operation than the authorized sequence of operations and does not specify to provide or output from the key engine component after performing the third operation, the sequence of operations 360 does not match the authorized sequence of operations 300.

Figure 3D:
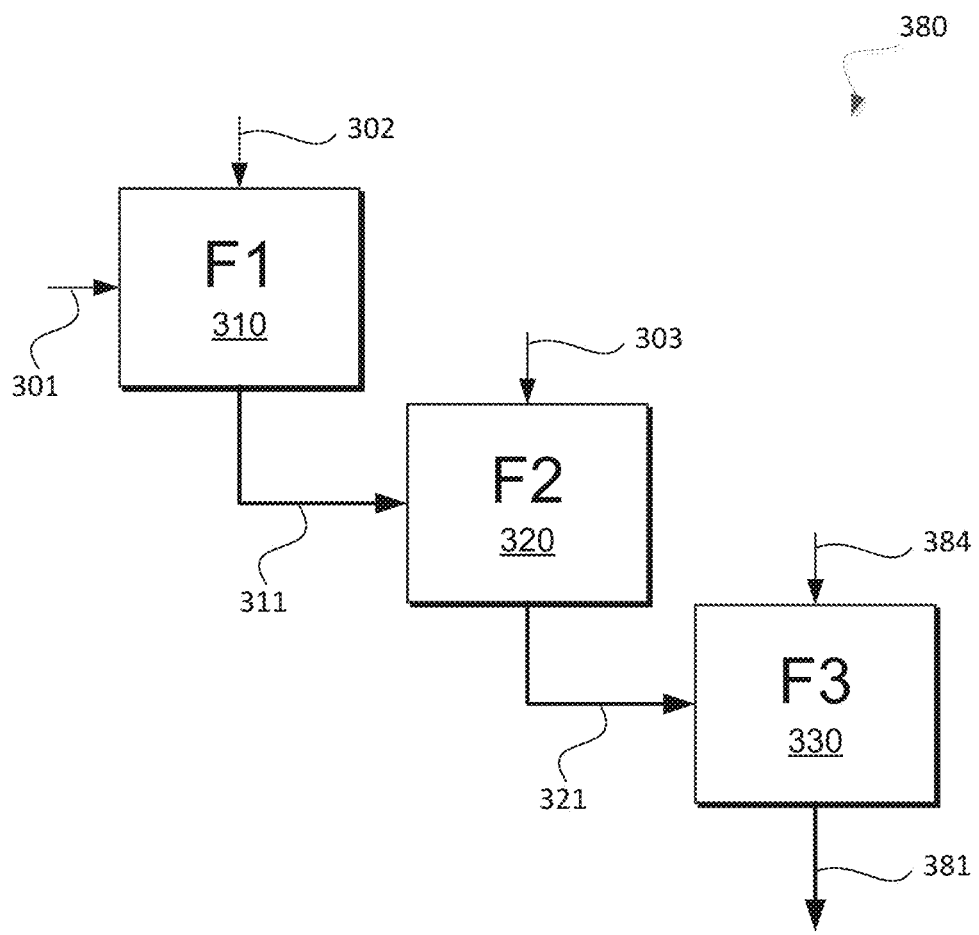
FIG. 3D is a block diagram of another example sequence of operations that does not match the authorized sequence of operations in accordance with some embodiments.

FIG. 3D is a block diagram of another example sequence of operations 380 that does not match the authorized sequence of operations 300. In general, the sequence of operations 380 may be received by a key engine component (e.g., the key engine component 120 of FIG. 1) and compared with an authorized sequence of operations.

As shown in FIG. 3D, the sequence of operations 380 includes operations 310, 320, and 330. However, operation 330 receives a hardware based value 384 instead of the third software based value 304. The operation 330 may generate an output value 381 based on the hardware based value 384 and the second output value 321 from the second operation 320. However, since one of the sources of the input values of the operation 330 has changed (e.g., from the software based value 304 to the hardware based value 384), the sequence of operations 380 does not match the authorized sequence of operations 300. As such, sources of input values may be compared with the sources of the input values of the authorized sequence of operations to determine if there is a match with the authorized sequence of operations.

The comparing of the sequence of operations 340, 360, or 380 with the authorized sequence of operations 300 may be based on a comparing of hash values. For example, the authorized sequence of operations 300 may be represented by a hash value that is compared with a running hash value that corresponds to a currently executed operation from the sequence of operations 340, 360, or 380. As an example, a running hash value of the sequence of operations may be updated as each operation is performed or executed. For example, a first operation may generate a running hash value that is based on the type of the first operation and the input source of the first operation. A second operation may update the running hash value based on an output of the first operation, the type of the second operation, and the input source of the second operation. The running hash value may be similarly updated for each subsequent operation that is performed. The final operation may provide a final update to the running hash value and the final updated running hash value may be compared with the hash value of the authorized sequence of operations to determine if the sequence of operations matches the authorized sequence of operations.

FIGS. 3A-3D illustrate an example authorized sequence of operations and other sequences of operations. However, any combination of operations may be used for the purposes of the present disclosure and FIGS. 3A-3D are provided only as examples.

Figure 4A:
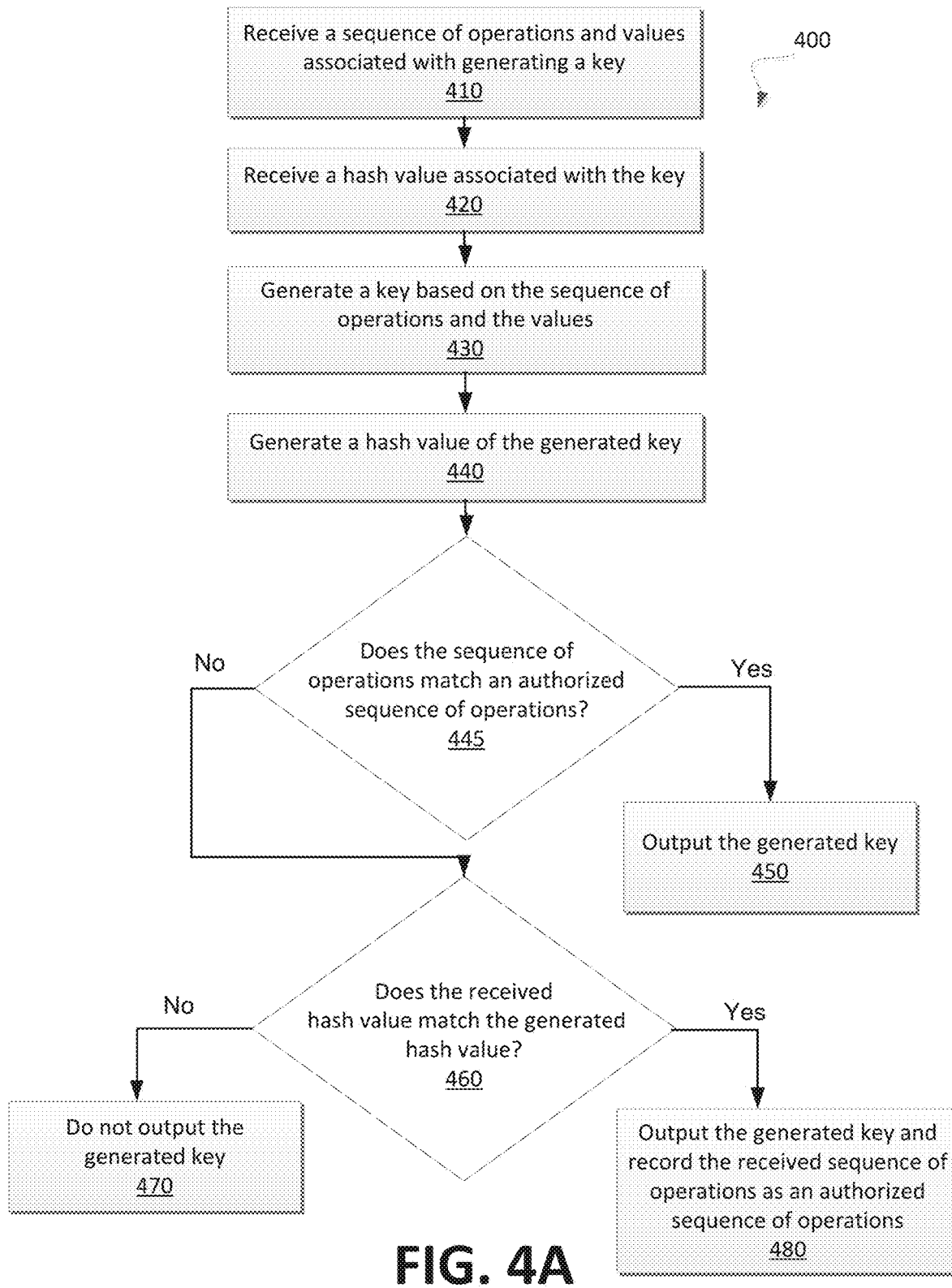
FIG. 4A is a flow diagram of an example method to output a generated key based on a sequence of operations, an authorized sequence of operations, and a hash value of a key in accordance with some embodiments of the disclosure.

FIG. 4A is a flow diagram of an example method 400 to output a generated key based on a sequence of operations, an authorized sequence of operations, and a hash value of a key. In general, the method 400 may be performed by processing logic that may comprise hardware (e.g., processing device, circuitry, dedicated logic, programmable logic, microcode, hardware of a device, etc.), software (e.g., instructions run or executed on a processing device), or a combination thereof. The key engine component 120 of FIG. 1 may perform the method 400.

As shown in FIG. 4A, the method 400 may begin with the processing logic receiving a sequence of operations and values associated with generating a key (block 410). The processing logic may further receive a hash value associated with the key (block 420). For example, an operating entity may provide the sequence of operations, values, and the hash value associated with the key. A key may be generated based on the sequence of operations and the received values (block 430). For example, a series of cryptographic operations may be performed based on software based values from the operating entity and hardware based values from a key contributor component. The result may be a value that corresponds to a generated key. The processing logic may further determine a hash value of the generated key (block 440). The hash value may be determined by a hash function. In some embodiments, a hash function may map digital data of arbitrary size (e.g., a generated key) to digital data of fixed size (e.g., the hash value of the generated key) where differences in input data produce differences in output data.

The processing logic may determine if the received sequence of operations matches an authorized sequence of operations (block 445). If the received sequence of operations does match the received sequence of operations, then the generated key may be outputted or provided (block 450). If the received sequence of operations does not match the received sequence of operations, the processing logic may subsequently determine if the received hash value matches the generated hash value of the generated key (block 460). If the received hash value does not match the hash value that has been generated or calculated from the generated key, then the generated key may not be outputted or provided (block 470). For example, a value may not be transmitted from a key engine component to decryption components of an integrated circuit. However, if the received hash value does match the determined hash value of the generated key, then the generated key may be outputted or provided and the received sequence of operations may be recorded as an authorized sequence of operations (block 480). For example, a value may be transmitted from the key engine component to decryption components of the integrated circuit and the key engine component may compare a subsequent sequence of operations with the newly recorded sequence of operations.

Figure 4B:
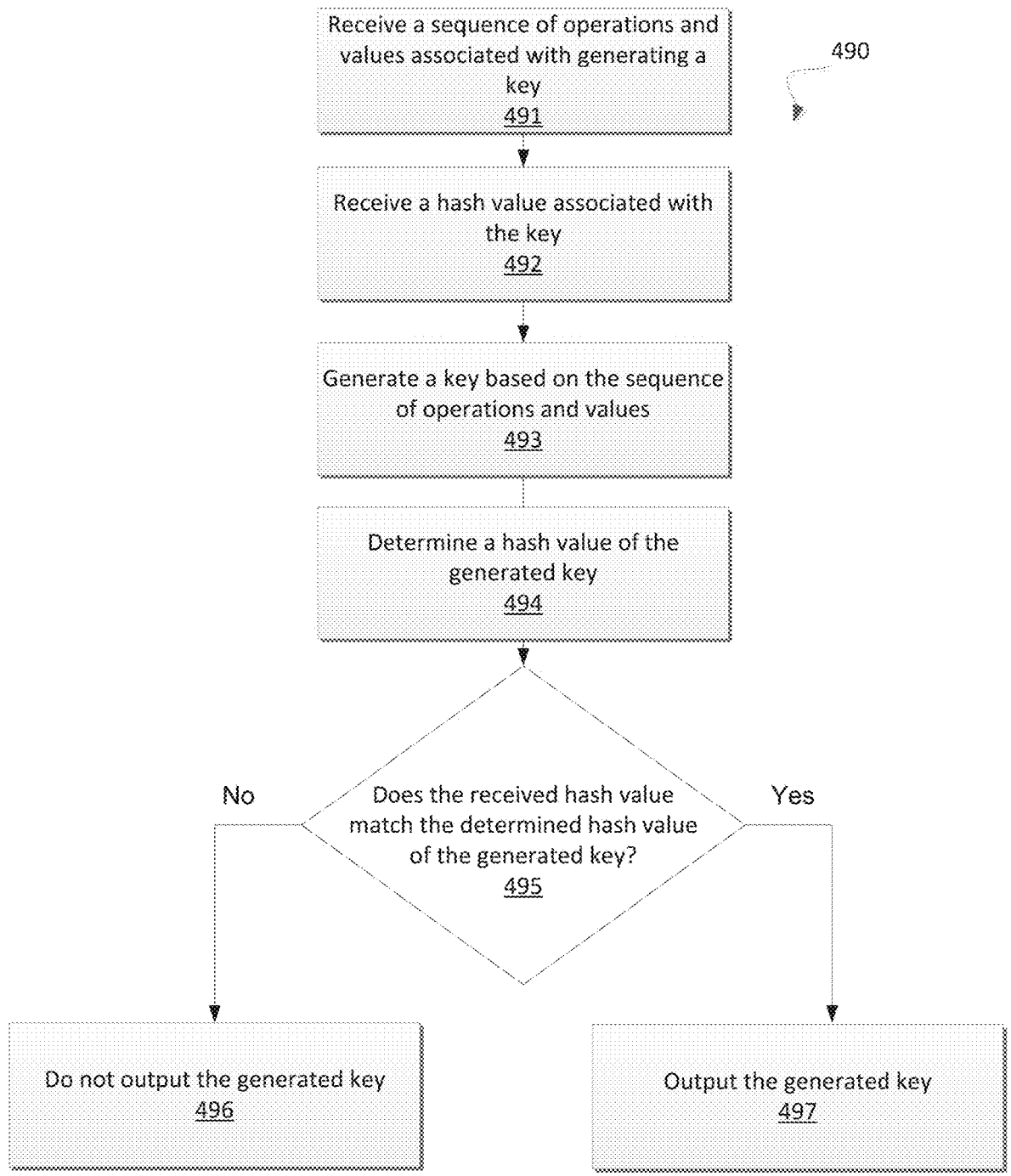
FIG. 4B is a flow diagram of an example method to output a generated key based on a hash value of the generated key in accordance with some embodiments.

FIG. 4B is a flow diagram of an example method 490 to output a generated key based on a hash value of the generated key. In general, the method 490 may be performed by processing logic that may comprise hardware (e.g., processing device, circuitry, dedicated logic, programmable logic, microcode, hardware of a device, etc.), software (e.g., instructions run or executed on a processing device), or a combination thereof. The key engine component 120 of FIG. 1 may perform the method 490.

As shown in FIG. 4B the method 490 may begin with the processing logic receiving a sequence of operations and values associated with generating a key (block 491). The processing logic may further receive a hash value associated with the key (block 492). For example, an operating entity may provide the sequence of operations, values, and the hash value associated with the key. The processing logic may generate a key based on the received sequence of operations and the values (block 493). For example, a series of cryptographic operations may be performed based on software based values from the operating entity and hardware based values from a key contributor component. The result may be a value that corresponds to a generated key. The processing logic may further determine a hash value of the generated key (block 494). The hash value may be determined or calculated by a hash function. In some embodiments, a hash function may map digital data of arbitrary size (e.g., a generated key) to digital data of fixed size (e.g., the hash value of the generated key) where differences in input data produce differences in output data.

The processing logic may subsequently determine if the received hash value matches the determined hash value of the generated key (block 495). If the received hash value does not match the hash value that has been determined or calculated from the generated key, then the generated key may not be outputted or provided (block 496). For example, a value may not be transmitted from a key engine component to decryption components of an integrated circuit. However, if the received hash value does match the determined hash value of the generated key, then the generated key may be outputted or provided (block 497). For example, a value may be transmitted from the key engine component to decryption components of the integrated circuit.

As such, a value corresponding to a key may be provided from a key engine component to decryption components of an integrated circuit when a received hash value matches a determined or calculated hash value of a generated key. The matching of the received hash value with the determined hash value of the key may indicate that the provider of the received hash value (e.g., the operating entity) may be an authorized entity (e.g., not an unauthorized entity seeking to retrieve the key or values associated with generating the key) since the received hash value matches the hash value of the key that is generated, thereby indicating that the operating entity is aware of the contents of the key.

Figure 5:
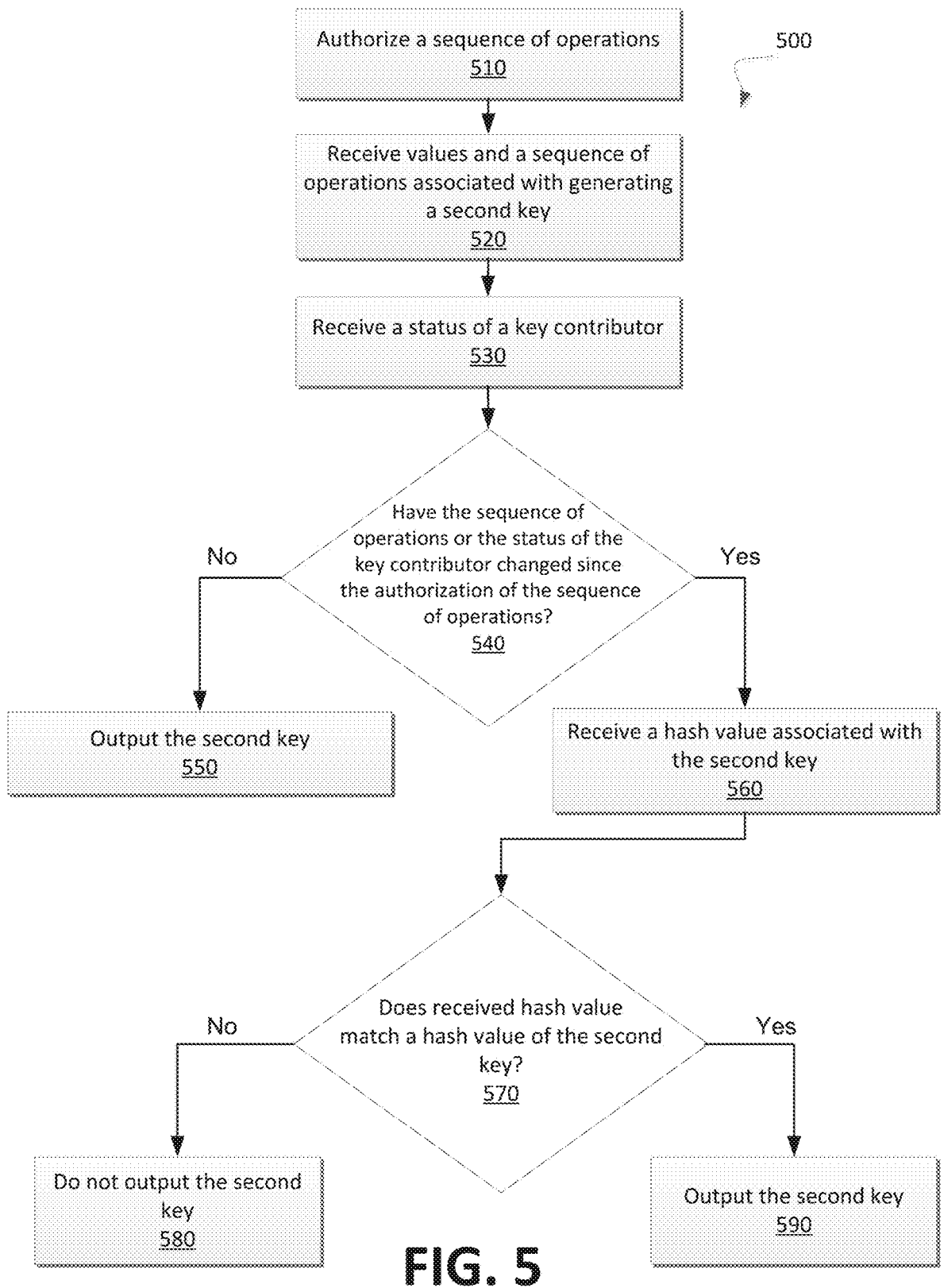
FIG. 5 is a flow diagram of an example method to receive a hash value associated with a generated key or to not receive the hash value associated with the generated key based on a change in a sequence of operations generating the key or a change in a status of a key contribution in accordance with some embodiments of the present disclosure.

FIG. 5 is a flow diagram of an example method 500 to receive a hash value associated with a generated key or to not receive the hash value associated with the generated key based on a change in a sequence of operations generating the key or a change in a status of a key contributor component. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. The key engine component 120 of FIG. 1 may perform the method 500.

As shown in FIG. 5, the method 500 may begin with the processing logic authorizing a sequence of operations (block 510). For example, a first key may be generated at a first time by the key engine component based on the authorized sequence of operations. Subsequently, at a second time, a request to generate a second key may be received. The processing logic may thus receive values and a sequence of operations associated with generating the second key (block 520). The processing logic may further receive a status of the key contributor (e.g., key contributor component 110) (block 530). In some embodiments, status information of the key contributor may be changed when an operating entity changes. For example, a first operating entity may provide a first configuration or implementation for the key contributor so that when the first operating entity provides a first input value to the key contributor, the key contributor may transmit a first output value (e.g., a CWC or the key contribution value) to the key engine component. A subsequent second operating entity may provide a second configuration or implementation for the key contributor to replace the first configuration or implementation. The second operating entity may then provide a second input value and the key contributor may then use the second configuration or implementation to generate a second output value based on the second input value and provide the second output value to the key engine component. As such, the status of the key contributor may specify a configuration or implementation of the key contributor where a change in the status indicates a different configuration or implementation that is used to generate a key contribution value or CWC.

Referring to FIG. 5, the processing logic may determine if the sequence of operations or the status of the key contributor have changed since the authorization of the sequence of operations (block 540). For example, a determination may be made if the sequence of operations and the status of the key contributor when the first key was generated are different than the received sequence of operations and the received status of the key contributor for the generating of the second key. If neither the sequence of operations nor the status of the key contributor have changed since the generation of the first key, then the second key may be outputted or provided (block 550). However, if either or both of the sequence of operations or the status of the key contributor have changed since the generation of the first key, then a hash value associated with the second key may be received (block 560). For example, if the sequence of operations or the status of the key contributor of the prior key (e.g., the first key) have changed, then a request may be transmitted by the key engine component to the operating entity (e.g., software) to provide the hash value associated with the second key. Subsequently, the processing logic may determine if the hash value received from the operating entity matches the hash value of the second key (block 570). For example, the second key may be generated based on the sequence of operations and the hash value of the second key may be calculated or generated by the key engine component. If the received hash value does not match the calculated hash value of the second key, then the second key may not be outputted or provided (block 580). For example, a value may not be transmitted between the key engine and decryption components of an integrated circuit. However, if the received hash value does match the generated hash value of the second key, then the second key may be outputted or provided (block 590). For example, a value may be transmitted between the key engine and the decryption components of the integrated circuit.

As such, the hash value may not be required to output a key if the sequence of operations used to generate the prior key and the status of the key contributor when the prior key was generated have not changed. Accordingly, subsequent keys may be generated without providing the hash value to the key engine component when the sequence of operations and the status of the key contributor matches the prior sequence of operations and the prior status of the key contributor when the prior key was generated.

In some embodiments, the operating entity may provide the values associated with generating a key and may not provide the sequence of operations. In such a case, the prior sequence of operations may be used. If the operating entity provides a new sequence of operations that differs from the prior sequence of operations, then the hash value may be requested from the operating entity. Furthermore, in some embodiments, the comparing of the sequence of operations with the authorized sequence of operations or the prior sequence of operations may include the comparing of hash values corresponding to the sequences of operations. For example, an authorized hash value corresponding to the authorized sequence of operations may be compared with a running hash value corresponding to a currently executed operation from the sequence of operations.

Figure 6:
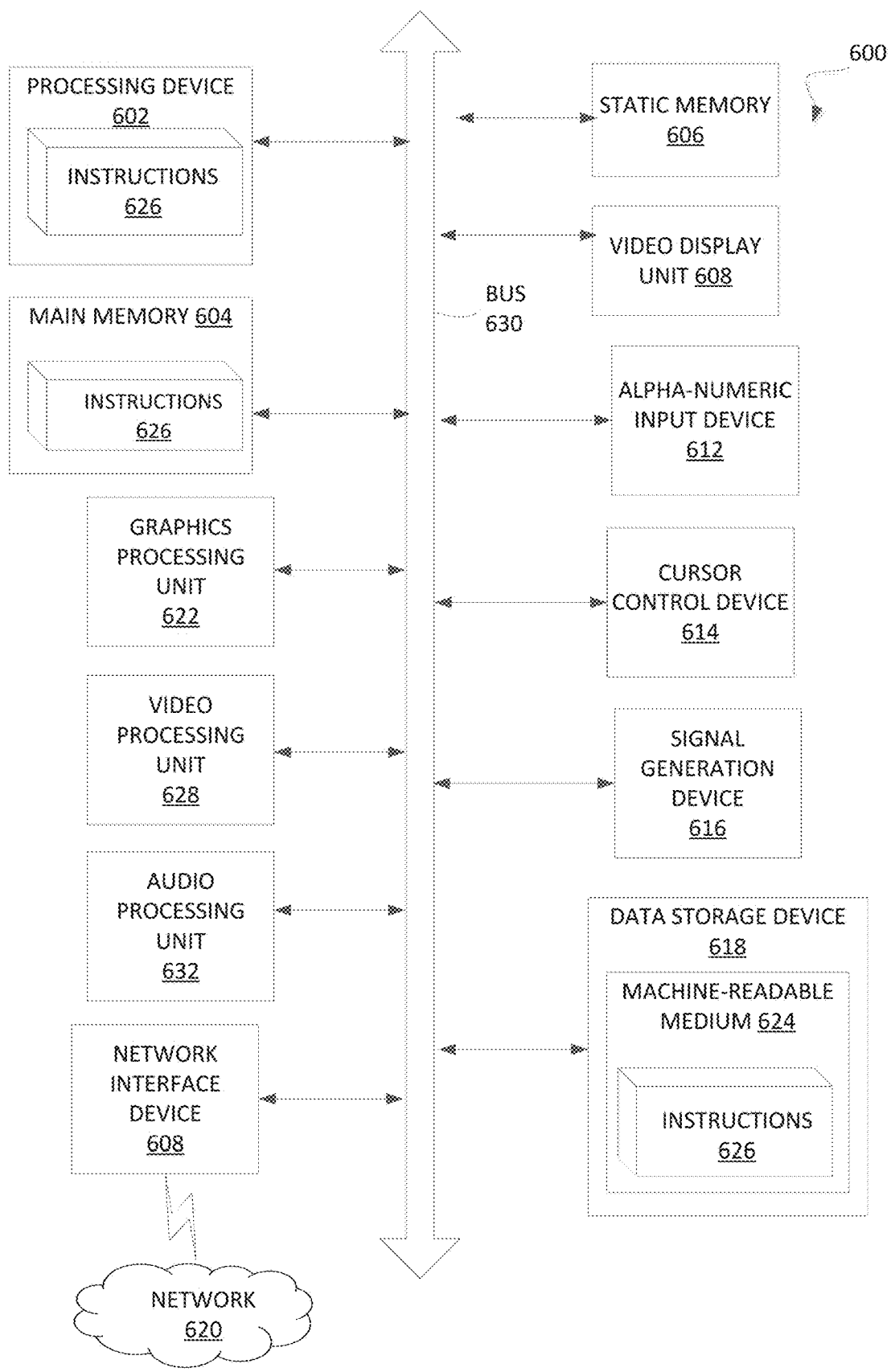
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616

(e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to a key engine (e.g., key engine 120 of FIG. 1). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving a plurality of values associated with generating a key;
   receiving a sequence of operations associated with generating the key using the received plurality of values;
   determining, by a processing device, whether the received sequence of operations corresponds to an authorized sequence of operations associated with generating the key, wherein the received sequence of operations specifies an order of the received plurality of values that are inputs to respective operations in the received sequence of operations; and
   in response to determining that the received sequence of operations corresponds to the authorized sequence of operations by determining that the received sequence of operations was performed in the specified order, providing the key based on the received sequence of operations and the received plurality of values.

2. The method of claim 1, wherein determining whether the received sequence of operations corresponds to the authorized sequence of operations comprises:
   generating a first hash value based on the received sequence of operations;
   receiving a second hash value based on the authorized sequence of operations; and determining whether the first hash value matches the second hash value, wherein the received sequence of operations corresponds to the authorized sequence of operations responsive to the first hash value matching the second hash value.

3. The method of claim 1, wherein the order of operations is used to generate the key.

4. The method of claim 1, further comprising:
receiving status information associated with a component providing at least one of the received plurality of values;
determining whether the status information is different than a prior status information associated with the generating of a prior key; and
transmitting a request for a hash value in response to determining that the status information is different than the prior status information and not transmitting the request for the hash value in response to determining that the status information is not different than the prior status information.

5. The method of claim 1, further comprising:
in response to determining that the received sequence of operations does not correspond to the authorized sequence of operations, refraining from providing the key based on the received sequence of operations and the plurality of values.

6. The method of claim 1, further comprising:
decrypting data with the provided key in response to determining that the received sequence of operations corresponds to the authorized sequence of operations.

7. The method of claim 1, wherein determining whether the received sequence of operations corresponds to the authorized sequence of operations comprises:
determining whether one or more sources of the received plurality of values match one or more sources of values specified by the authorized sequence of operations, wherein the received sequence of operations corresponds to the authorized sequence of operations responsive to the one or more sources of the received plurality of values matching the one or more sources of the values specified by the authorized sequence of operations.

8. A system comprising:
a memory; and
a processing device, operatively coupled with the memory, to:
receive a plurality of values associated with generating a key;
receive a sequence of operations associated with generating the key using the received plurality of values;
determine whether the received sequence of operations corresponds to an authorized sequence of operations associated with generating the key, wherein the received sequence of operations specifies an order of the received plurality of values that are inputs to respective operations in the received sequence of operations; and
in response to determining that the received sequence of operations corresponds to the authorized sequence of operations by determining that the received sequence of operations was performed in the specified order, providing the key based on the received sequence of operations and the received plurality of values.

9. The system of claim 8, wherein to determine whether the received sequence of operations corresponds to the authorized sequence of operations, the processing device is further to:

generate a first hash value based on the received sequence of operations;
receive a second hash value based on the authorized sequence of operations; and
determine whether the first hash value matches the second hash value, wherein the received sequence of operations corresponds to the authorized sequence of operations responsive to the first hash value matching the second hash value.

10. The system of claim 8, wherein the order of operations is used to generate the key.

11. The system of claim 8, wherein the processing device is further to:
in response to determining that the received sequence of operations does not correspond to the authorized sequence of operations, refrain from providing the key based on the received sequence of operations and the plurality of values.

12. The system of claim 8, wherein the processing device is further to:
receive status information associated with a component providing at least one of the received plurality of values;
determine whether the status information is different than a prior status information associated with the generating of a prior key; and
transmit a request for a hash value in response to determining that the status information is different than the prior status information and not transmitting the request for the hash value in response to determining that the status information is not different than the prior status information.

13. The system of claim 8, wherein the processing device is further to:
decrypt data with the provided key in response to determining that the received sequence of operations corresponds to the authorized sequence of operations.

14. The system of claim 8, wherein to determine whether the received sequence of operations corresponds to the authorized sequence of operations, the processing device is further to:
determine whether one or more sources of the received plurality of values match one or more sources of values specified by the authorized sequence of operations, wherein the received sequence of operations corresponds to the authorized sequence of operations responsive to the one or more sources of the received plurality of values matching the one or more sources of the values specified by the authorized sequence of operations.

15. A non-transitory computer readable medium comprising instructions, which when executed by a processing device, cause the processing device to:
receive a plurality of values associated with generating a key;
receive a sequence of operations associated with generating the key using the received plurality of values;
determine whether the received sequence of operations corresponds to an authorized sequence of operations associated with generating the key, wherein the received sequence of operations specifies an order of the received plurality of values that are inputs to respective operations in the received sequence of operations; and
in response to determining that the received sequence of operations corresponds to the authorized sequence of operations by determining that the received sequence of operations was performed in the specified order, providing the key based on the received sequence of operations and the received plurality of values.

16. The non-transitory computer readable medium of claim 15, wherein to cause the processing device to determine whether the received sequence of operations corresponds to the authorized sequence of operations, the instructions further cause the processing device to:
generate a first hash value based on the received sequence of operations;
receive a second hash value based on the authorized sequence of operations; and
determine whether the first hash value matches the second hash value, wherein the received sequence of operations corresponds to the authorized sequence of operations responsive to the first hash value matching the second hash value.

17. The non-transitory computer readable medium of claim 15, wherein the instructions further cause the processing device to:
in response to determining that the received sequence of operations does not correspond to the authorized sequence of operations, refrain from providing the key based on the received sequence of operations and the plurality of values.

18. The non-transitory computer readable medium of claim 15, wherein the instructions further cause the processing device to:
receive status information associated with a component providing at least one of the received plurality of values;
determine whether the status information is different than a prior status information associated with the generating of a prior key; and
transmit a request for a hash value in response to determining that the status information is different than the prior status information and not transmitting the request for the hash value in response to determining that the status information is not different than the prior status information.

19. The non-transitory computer readable medium of claim 15, wherein the instructions further cause the processing device to:
decrypt data with the provided key in response to determining that the received sequence of operations corresponds to the authorized sequence of operations.

20. The non-transitory computer readable medium of claim 15, wherein to cause the processing device to determine whether the received sequence of operations corresponds to the authorized sequence of operations, the instructions further cause the processing device to:
determine whether one or more sources of the received plurality of values match one or more sources of values specified by the authorized sequence of operations, wherein the received sequence of operations corresponds to the authorized sequence of operations responsive to the one or more sources of the received plurality of values matching the one or more sources of the values specified by the authorized sequence of operations.

* * * * *